US010499761B2

(12) United States Patent
Dos Santos et al.

(10) Patent No.: US 10,499,761 B2
(45) Date of Patent: Dec. 10, 2019

(54) BEVERAGE-DISPENSING MACHINE COMPRISING A PIVOTING POD CONTAINER EQUIPPED WITH A DEVICE FOR MOVING DISTRIBUTION NEEDLES

(71) Applicant: SEB S.A., Ecully (FR)

(72) Inventors: Quentin Dos Santos, Dijon (FR); Arnaud Riva, Dijon (FR); Matthieu Briere, Gemeaux (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 16/075,017

(22) PCT Filed: Feb. 2, 2017

(86) PCT No.: PCT/FR2017/050240
§ 371 (c)(1),
(2) Date: Aug. 2, 2018

(87) PCT Pub. No.: WO2017/134393
PCT Pub. Date: Aug. 10, 2017

(65) Prior Publication Data
US 2019/0038067 A1 Feb. 7, 2019

(30) Foreign Application Priority Data
Feb. 4, 2016 (FR) ...................................... 16 50910

(51) Int. Cl.
A47J 31/36 (2006.01)
A47J 31/40 (2006.01)
(52) U.S. Cl.
CPC ......... A47J 31/3695 (2013.01); A47J 31/407 (2013.01)

(58) Field of Classification Search
CPC .. A47J 31/3628; A47J 31/369; A47J 31/3695; A47J 31/407; A47J 31/3623; A47J 31/3676
(Continued)

(56) References Cited

U.S. PATENT DOCUMENTS 3,143,955 A * 8/1964 Rockwell ............... A47J 31/408
226/156
6,792,980 B1 * 9/2004 Cortese ............... A47J 31/3628
141/1
(Continued)

FOREIGN PATENT DOCUMENTS

EP 1 996 051 A2 12/2008
GB 1051012 A 12/1966
(Continued)

OTHER PUBLICATIONS

International Search Report as issued in International Patent Application No. PCT/FR2017/050240, dated Jun. 12, 2017.
(Continued)

Primary Examiner — Tu B Hoang
Assistant Examiner — Masahiko Muranami
(74) Attorney, Agent, or Firm — Pillsbury Winthrop Shaw Pittman LLP

(57) ABSTRACT

A machine for dispensing beverages from a pod, includes a frame, a container including a pod-receiving zone, a fluid-dispensing needle holder to hold fluid-dispensing needles and a moving system for moving the needle holder from a position released from the pod to a position engaged on the pod, the moving system including a control member mounted in rotation about a vertical axis on the frame, wherein the control member includes a body equipped with at least one spiral ramp which cooperates with at least one pin secured to a piston, the piston being secured to the needle
(Continued)

holder and mounted in translation along the vertical axis, the at least one spiral ramp including at least two different slope zones, configured to correspond respectively to a zone where the fluid-dispensing needles approach contact with the pod and to a work zone where the fluid-dispensing needles are engaged on the pod.

20 Claims, 7 Drawing Sheets

(58) Field of Classification Search
USPC .............. 99/295, 302 R, 307, 315, 318, 323; 426/425
See application file for complete search history.

(56) References Cited

U.S. PATENT DOCUMENTS

| | | | | |
|---|---|---|---|---|
| 2003/0066431 A1* | 4/2003 | Fanzutti | .................. | A47J 31/36 99/279 |
| 2006/0225575 A1* | 10/2006 | Denisart | ............. | A47J 31/3695 99/275 |
| 2009/0130270 A1* | 5/2009 | Cortese | ............... | A47J 31/0647 426/281 |
| 2010/0288132 A1* | 11/2010 | Gavillet | .............. | A47J 31/3628 99/295 |
| 2011/0271841 A1* | 11/2011 | Talon | .................. | A47J 31/3685 99/275 |
| 2012/0312174 A1* | 12/2012 | Lambert | ............. | A47J 31/3638 99/295 |
| 2014/0360327 A1 | 12/2014 | Dingle et al. | | |
| 2014/0373722 A1* | 12/2014 | Talon | .................. | A47J 31/0668 99/280 |
| 2015/0191340 A1* | 7/2015 | Lambrecht | ........... | B67D 1/0412 222/82 |
| 2015/0201790 A1* | 7/2015 | Smith | ....................... | A23F 3/18 426/431 |

FOREIGN PATENT DOCUMENTS

| | | |
|---|---|---|
| WO | WO 2007/111884 A2 | 10/2007 |
| WO | WO 2013/119543 A1 | 8/2013 |
| WO | WO 2015/132203 A1 | 9/2015 |

OTHER PUBLICATIONS

International Preliminary Report on Patentability and the Written Opinion of the International Searching Authority as issued in International Patent Application No. PCT/FR2017/050240, dated Aug. 7, 2018.

\* cited by examiner

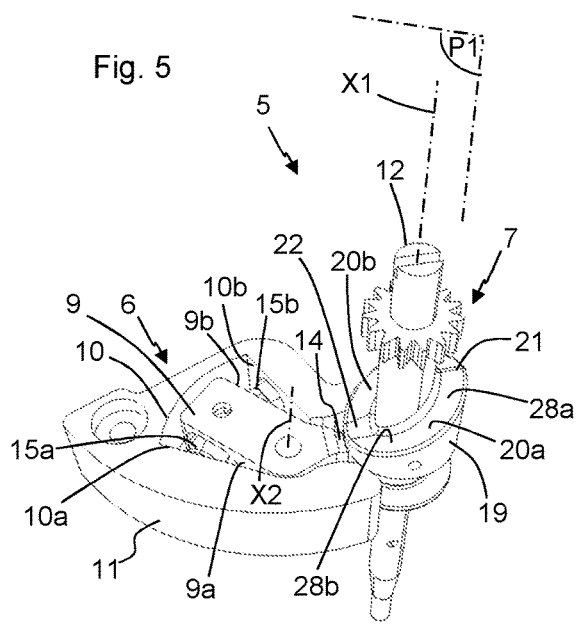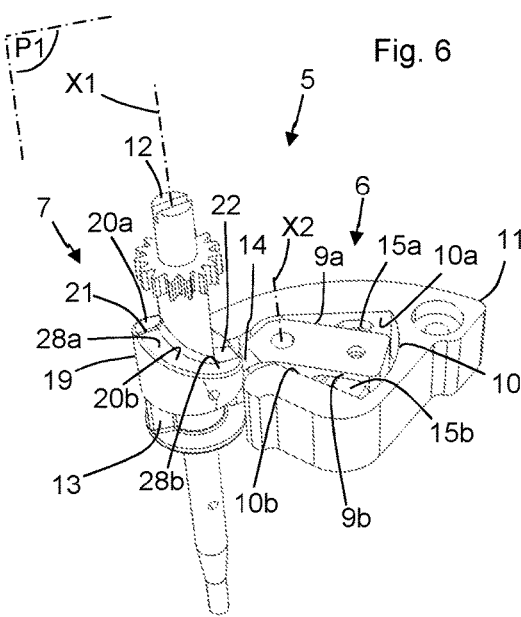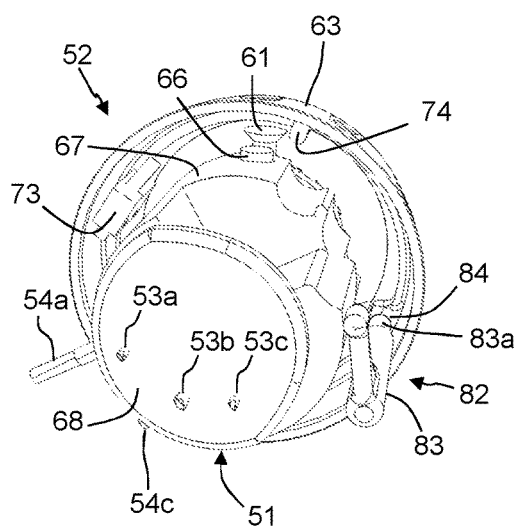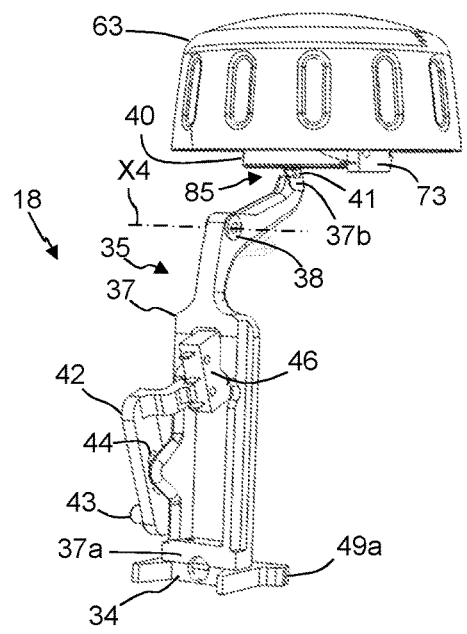

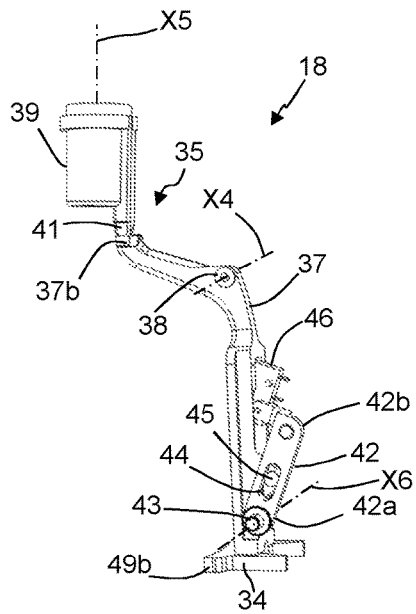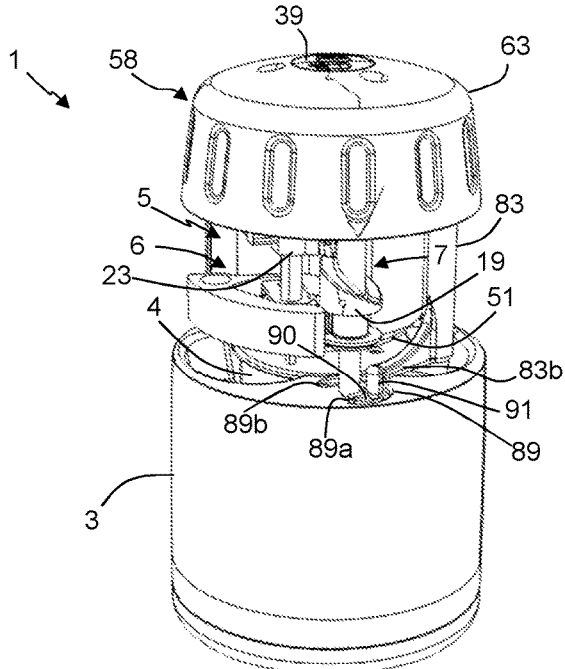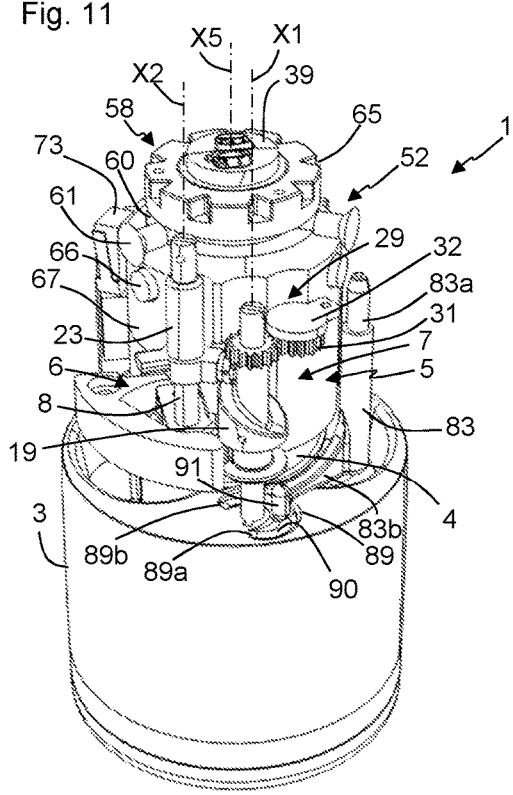

BEVERAGE-DISPENSING MACHINE COMPRISING A PIVOTING POD CONTAINER EQUIPPED WITH A DEVICE FOR MOVING DISTRIBUTION NEEDLES

CROSS-REFERENCE TO RELATED APPLICATIONS

This application is the U.S. National Stage of PCT/FR2017/050240 filed Feb. 2, 2017, which in turn claims priority to French patent application number 1650910 filed Feb. 4, 2016. The content of these applications are incorporated herein by reference in their entireties.

TECHNICAL FIELD

This invention concerns a machine for dispensing beverages from a pod and has the principal objective of facilitating the manipulation of the machine and the perforation of the pod by fluid-dispensing needles during preparation of a beverage.

"Pod" means a capsule comprising one or more chambers, each chamber containing an ingredient forming part of the composition of the beverage, these ingredients being intended to be mixed with water during preparation of the beverage.

In a particular, non-restrictive embodiment, the pod consists of a capsule comprising one or more storage chambers, each storage chamber containing an ingredient, in particular a liquid, a channel allowing water to be dispensed, and a mixing chamber. The pod is configured to separate the mixing chamber from the at least one storage chamber and from the channel, in an initial mode, and to cause the mixing chamber to communicate with the at least one chamber and with the channel, in a beverage preparation mode. In addition, the machine comprises air injection means and water injection means, configured to perforate the pod and to inject air and water respectively into the at least one storage chamber and into the channel, in the beverage preparation mode. In this preparation mode, the air injected into the at least one storage chamber pushes the at least one ingredient into the mixing chamber and, concomitantly, the water injected into the channel is transferred into said mixing chamber, which allows the ingredient or ingredients to mix with the water before the beverage is released into a container, such as a glass or tumbler.

STATE OF THE ART

Patent applications or patents published under the numbers US20140360327, GB1051012, WO2013119543 and EP1996051 disclose machines for dispensing beverages from a pod.

According to this prior art, the beverage-dispensing machine comprises a frame, a container including a pod-receiving zone, a holder for fluid-dispensing needles and a system for moving the needle holder from a position released from the pod to a position engaged on the pod.

In the document GB1051012, the system for moving the needle holder is implemented either by connecting rods ensuring circular translation of the needle holder, or by means for guiding the needle holder in vertical translation. In the document WO2013119543, the system for moving the needle holder is implemented by a mechanism with connecting rods and sliding connections ensuring translation of the needle holder with respect to the pod container. In the document EP1996051, the system for moving the needle holder is implemented by a mechanism with pivoting connections and sliding connections, ensuring the combined switchover of the container and of the needle holder from the released position to the engaged position, and vice versa.

SUMMARY OF THE INVENTION

The objective of this invention is to implement a machine for dispensing beverages from a pod that presents the aforementioned characteristics from the prior art, with a needle holder moving system that has an optimized design ensuring suitable perforation of the pod, and is easy to use.

For this purpose, other than the aforementioned characteristics that are found on the dispensing machines already known, the moving system of the dispensing machine according to the invention comprises a control member mounted in rotation about a vertical axis on the frame. This control member comprises a body equipped with at least one spiral ramp which cooperates with at least one pin secured to a piston. The piston is itself secured to the needle holder and mounted in translation along the vertical axis. In addition, the at least one spiral ramp comprises at least two zones with different slopes configured to correspond respectively to a zone where the needles approach contact with the pod and to a work zone where the needles are engaged on the pod. This design allows the user to engage the needle holder on the pod simply by turning the control member. The slope of the approach zone is more pronounced than that of the work zone, which makes it possible to lower the needle holder quickly to put it in contact with the pod without significant effort and with a limited rotation of the control member during this approach phase, and then to engage the pod more slowly by applying the least effort and conserving maximum rotation of the control member during this work phase.

Preferably, the control member comprises a wheel secured to the body. This wheel allows suitable handling while reducing the effort to be made in order to actuate the body of the moving system.

Advantageously, the work zone is configured to include a first phase of penetration of the needles into the pod and a second phase of sealing of the pod by means of a gasket arranged on the needle holder. The slope of the ramp is optimized to guarantee a good compromise between the piercing effort and the pod activation effort in the penetration phase, then a suitable compression of the gasket between the pod and the needle holder in the sealing phase. Preferably, the gasket is on the surface on the needle holder, said needles passing through the gasket. This eliminates any air intake between the pod and the needle holder, in order to guarantee a suitable beverage preparation cycle.

Preferably, the at least one ramp comprises two stopping protrusions at the extreme rotation positions of the control member. This makes it possible to keep the needle holder correctly in the released position and in the engaged position.

Advantageously, the at least one ramp is configured so that moving the needle holder from the released position to the engaged position, and vice versa, is carried out by turning the control member through an angle between 50° and 90°, preferably 65°. This guarantees a fluid wrist movement for the user, who can thus engage the needle holder on the pod by making a natural movement, without significant effort.

In one embodiment of the machine, the body comprises three uniformly distributed ramps, guaranteeing good distribution of load during the work phase. However, a different number of ramps could be envisioned.

In one embodiment of the machine, the moving system comprises means for assisting the lowering of the piston, which reduces the load during manipulation of the control member. Preferably, these piston lowering assistance means comprise a spring.

Preferably, the machine comprises a system for detecting the engaged position of the needles on the pod. In one embodiment, the system for detecting the engaged position of the needles on the pod comprises a switch. This detection system guarantees that the beverage preparation cycle starts only when the needle holder is suitably engaged on the pod.

Preferably, the needles each present a sharpening with three slopes. This allows a better compromise between the piercing effort and the piercing stroke.

In one embodiment of the machine, the needles are of at least two different lengths. This allows the piercing efforts made by the needles to be sequenced during the maneuvering of the needle holder.

Preferably, the machine comprises stopping means on the pod in the closed position of the container with respect to the frame, configured to guarantee that the pod is held in position in the container during the release of the needles. During the rising of the needle holder, after the preparation of the beverage, it is possible that the pod may remain stuck to said needle holder; the stopping means allow the pod to be detached to cause it to drop into the container's receiving zone, which prevents the pod from rising with the needle holder and blocking the opening of the container.

Advantageously, the machine comprises an opening/closing device arranged between the frame and the container to pivot the container about a vertical axis between a closed position permitting dispensing, and an open position permitting access to said container, and a locking/unlocking system configured to keep the container in the closed position with respect to the frame and, conversely, to release the container so that it can pivot into the open position.

In addition, the machine comprises a system for deactivation of the locking/unlocking system, configured to prevent the activation of said locking/unlocking system as long as the system for moving the needle holder is in an engaged position on the pod. This prevents damage to the machine.

In addition, the machine comprises a system for blocking the moving system, configured to keep the needle holder in the position released from the pod as long as the container has not returned to the closed position. This also prevents damage to the machine.

Preferably, the machine comprises load transfer means arranged between the frame and the container, configured to stabilize the container during operation of the machine, in particular during perforation of the pod.

BRIEF DESCRIPTION OF THE FIGURES

The following description demonstrates the characteristics and advantages of the beverage-dispensing machine covered by the invention, according to a preferred and non-restrictive design. This description is supported by figures, among which:

FIGS. 5 and 6 illustrate two overall views showing the system for orientation of the opening of the container and the opening assistance system for said container, with the container in the open position;

FIG. 7 illustrates an overall view showing in particular the system for moving the needle holder;

FIGS. 8 and 9 illustrate two overall views showing in particular the container locking/unlocking device, in the unlocked position;

FIGS. 10 and 11 illustrate two overall views showing the container opening/closing device and the system for moving the needle holder, with the container in the closed position and the needle holder in the released position;

FIG. 12 illustrates an overall view showing the system for orientation of the opening of the container and the opening assistance system for said container, with the container in the closed position;

DETAILED DESCRIPTION

Figure 1:
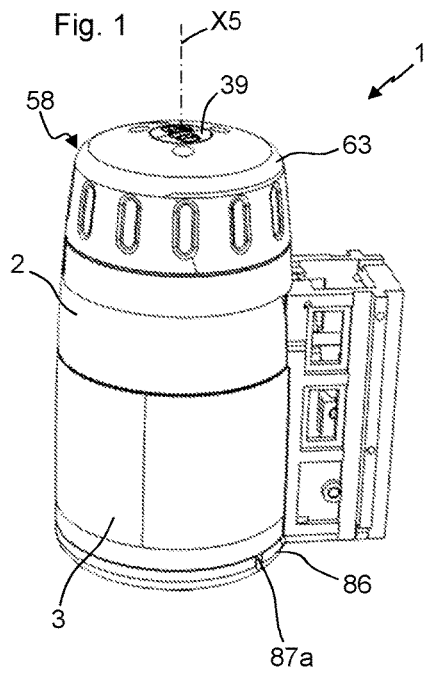
FIGS. 1 and 2 illustrate two overall views of a portion of the dispensing machine comprising the essential characteristics in relation to the invention, in particular the container that receives the pod, the container opening/closing device, the fluid-dispensing needle holder and the system for moving the needle holder, the container being respectively in the closed position and in the open position with respect to the frame.
Figure 2:
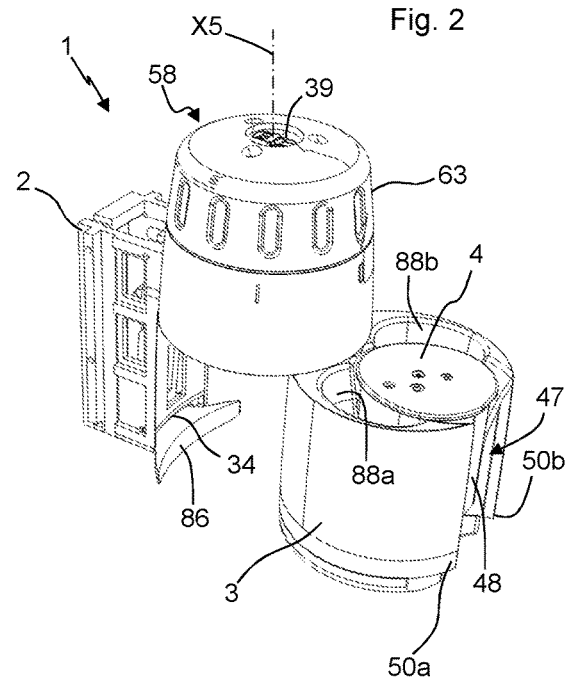

FIGS. 1 and 2 illustrate only the portions of the dispensing machine 1 implementing the invention. This machine 1 comprises other characteristics such as a fluid supply system and a system to manage the activation of this fluid supply system, which are not described below, as they are not essential to the implementation of the invention.

The machine 1 comprises a frame 2 and a container 3. The container 3 allows a pod 4 to be received. This container 3 is mounted with a pivoting connection with respect to the frame 2, about a first vertical axis X1 illustrated in particular in FIGS. 3 and 4. The container 3 can pivot from a closed position, illustrated in FIG. 1, to an open position, illustrated in FIG. 2, by rotating 180° about this vertical axis X1. And vice versa. In addition, the direction of rotation can be clockwise or counter-clockwise, at the user's discretion, as will be shown in detail below. For this purpose, the machine 1 comprises an opening/closing device 5 arranged between the frame 2 and the container 3, as illustrated for example in FIGS. 3, 4, 10, 11, 15 and 19.

This opening/closing device 5 comprises a system 6 for orientation of the opening of the container 3 and an opening assistance system 7, illustrated in particular in FIGS. 4, 5, 6, 11 and 12. The orientation system 6 allows the container 3 to be opened in the direction opposite to the direction of the preceding closing. The assistance system 7 allows the container 3 to be brought from the closed position to the open position by a 180° rotation movement, without manipulation by the user.

The orientation system 6 comprises a rod 8 arranged along a second vertical axis X2, in a manner secured with respect to the frame 2. This rod 8 holds a trigger 9 pivotably mounted along the second vertical axis X2 and housed in a hollow area 10 of a part 11 which is fixed to the frame 2. In this way, the pivoting of the trigger 9 about the vertical axis X2 is limited by the lateral edges 10a, 10b of the hollow area 10.

The assistance system 7 comprises an axle 12 arranged along the first vertical axis X1. This axle 12 is mounted with a pivoting connection with respect to the frame 2 along the first vertical axis X1, and it is secured to the container 3. The orientation system 6 comprises a vertical rib 13 arranged on the axle 12 and configured to bear against a nose 14 of the trigger 9 during rotation of the axle 12.

Two springs 15a, 15b, indicated by portions of cylinders, are arranged between the lateral sides 9a, 9b of the trigger 9 and the lateral edges 10a, 10b of the hollow area 10, as illustrated in particular by FIGS. 5, 6 and 12. When the container 3 is in the open position, the vertical rib 13 is released, contrary to the nose 14 of the trigger 9 which is in the average equilibrium position in the area 10, as illustrated in particular by FIGS. 5 and 6.

During the closing of the container 3 by counter-clockwise rotation, illustrated by the arrow 16 on FIG. 12, the axle 12 and the vertical rib 13 turn about the vertical axis X1, said vertical rib 13 then bearing against the nose 14, which causes the trigger 9 to rotate clockwise, illustrated by the arrow 17 on FIG. 12. The spring 15b compresses until the lateral side 9b of the trigger 9 abuts against the lateral edge 10b of the hollow area 10, which stops the rotation of the container 3 in a precise position of closing illustrated in FIG. 1. The operating principle remains the same and is reversed when the container 3 is closed by turning it clockwise about the vertical axis X1, in which case the lateral side 9a of the trigger 9 turns counter-clockwise and abuts against the lateral edge 10a of the hollow area 10, the spring 15a being compressed in this case. The stopping position of the vertical rib 13 remains identical when it abuts against the nose 14 of the trigger 9, whether the container 3 is turned 180° clockwise or counter-clockwise during the closing. In addition, the presence of this trigger 9 abutting against one or the other of the lateral edges 10a, 10b of the hollow area 10, in the closed position, requires that the container 3 be opened in the direction opposite to the direction of the closing just performed.

A locking/unlocking system 18 allows the container 3 to be kept in the closed position with respect to the frame 2 and, conversely, allows the container 3 to be released so that it can be pivoted to an open position. This locking/unlocking system 18 will be described in more detail below. During unlocking, the release of the container 3 allows the spring 15a, 15b, which is in the compressed state, to relax and push the trigger 9 to cause it to pivot in the direction opposite to the direction of the preceding closing. The nose 14 then bears against the vertical rib 13, which forces the axle 12 to turn in the direction opposite to the direction of the preceding closing, thus giving an impulse to the container 3 and releasing it from the closed position.

The assistance system 7 comprises a plate 19 secured to the axle 12, this plate 19 comprising two ramps 20a, 20b arranged symmetrically with respect to a vertical plane P1 passing through the vertical axis X1, as illustrated in FIGS. 5, 6 and 12. These ramps 20a, 20b are slanted and form a top 21 and a housing 22 opposite said top 21. The assistance system 7 further comprises a support member 23 in the form of a hollow cylinder slidably mounted on the rod 8 along the second vertical axis X2. This support member 23 comprises a tab 24 which is arranged in a housing 25, as illustrated for example by FIGS. 3, 4 and 15. This housing 25 prevents the rotation of the tab 24, and thus ensures the mounting in translation of the support member 23 along the vertical axis X2. This support member 23 comprises a finger 26 equipped with a roller 27 mounted in rotation about a horizontal axis X3. This roller 27 bears against one or the other of the ramps 20a, 20b of the plate 19, according to the direction of rotation of the container 3. A spring (not illustrated) is arranged on the rod 8 along the axis X2 to apply a downward retraction force on the support member 19, which forces said container 3 to turn from the closed position to the open position, once said container 3 is released by the locking/unlocking device 18. In the closed position, the roller 27 is situated at the top 21 on the plate 19, in a position of equilibrium. The impulse given by the impulse system consisting of the springs 15a, 15b, of the trigger 9 and of the vertical rib 13, allows the trigger 27 to be engaged on one or the other of the ramps 20a, 20b according to the direction of rotation, the assistance system 7 then ensuring the complete opening of the container 3. In the open position, the roller 27 is positioned in the housing 22 on the plate 19, which ensures that the container 3 is suitably and stably kept in this open position.

As illustrated in FIGS. 5, 6 and 12, the ramps 20a, 20b on the plate 19 each comprise at least two different slope zones 28a, 28b allowing two torques to be applied to the container 3 during its opening. This makes it possible to reduce the load on the container 3 at the end of opening of the latter. In addition, the machine 1 comprises a buffer system 29, illustrated for example in FIGS. 4 and 11, configured to buffer the container 3 during its rotation to the open position. The buffer system 29 comprises a pinion 30 secured to the axle 12, which meshes with a sprocket wheel 31 secured to an oil buffer 32.

The machine 1 comprises a locking/unlocking system 18, illustrated in particular in FIGS. 2, 3, 4, 8, 9, 13, 14, 15 and 20, which allows the container 3 to be kept in a closed position with respect to the frame 2, in which position the beverage can be dispensed when a pod 4 is present in a receiving zone 33 of said container 3. The locking/unlocking system 18 comprises a movable lock 34, means 35 for control of the lock 34, arranged on the frame 2, and a housing 36 arranged on the container 3, this housing 36 being configured to receive the lock 34 when the container 3 is in the closed position. The control means 35 comprise a connecting rod 37 whose lower extremity 37a is secured to the lock 34. The connecting rod 37 is mounted with a pivoting connection 38 about a horizontal axis X4 with respect to the frame 2. The control means 35 also comprise a control button 39 mounted in translation along a vertical axis X5 with respect to the body 40. This control button 39 comprises a finger 41 which bears against the upper extremity 37b of the connecting rod 37, as illustrated in FIG. 9, in a determined position of said body 40, as will be explained below. This finger 41 is arranged vertically and off-center with respect to the vertical axis X5 of translation of the control button 39. A press on the control button 39 lowers the finger 41 which rests on the upper extremity 37b of the connecting rod 37, allowing it to pivot about the horizontal axis X4, and thus allowing the lock 34 to be released from the housing 36 on the container 3, which allows the container 3 to pivot to the open position, as explained previously. In addition, the control means 35 comprise a return element (not illustrated) of the lock 34, in the form of a spring, which applies force on the lock 34 and/or on the connecting rod 37 so as to ensure that said lock 34 returns to the position maintaining the container 3.

As illustrated in particular with regard to FIGS. 2, 3, 4, 8, 9, 13, 14, 16 and 20, a second connecting rod 42 has its lower extremity 42a mounted in pivoting connection 43 about a horizontal axis X6, with respect to the frame 2. The second connecting rod 42 comprises an opening 44 extending on a portion of its length, this opening 44 receiving a lug 45 arranged on the first connecting rod 37 secured to the lock 34. A presence sensor 46, such as a strip sensor, is secured at the upper extremity 42b of the second connecting rod 42. During pressure on the control button 39, the lower extremity 37a of the first connecting rod 37 pivots backwards about the horizontal axis X4. The lug 45 then applies a force to the second connecting rod 42, allowing the presence sensor 46 to pivot backwards about the horizontal axis X6. When the pressure on the control button 39 stops, the return element of the lock 34 acts in the opposite way on the first connecting rod 37, which itself acts on the second connecting rod 42, ensuring that the presence sensor 46 pivots forwards. The container 3 comprises a slot 47 allowing a portion of the contour 48 of the pod 4 to appear, when the latter is present in the receiving zone 33, as illustrated in particular in FIGS. 2, 3 and 16. When the presence sensor 46 is pivoted backwards, the latter is released from the slot 47, which allows the container 3 to pivot without interfering on the presence sensor 46. Conversely, when the presence sensor 46 is pivoted forwards, the latter penetrates the slot 47 and can come into contact with the wall 48 of the pod 4 or come into proximity with the latter, which allows the detection of the presence of said pod 4 in the receiving zone 33 of the container 3. The lock 34 comprises two slightly beveled teeth 49a, 49b which respectively abut against two points of contact 50a, 50b on the container 3, during the pivoting of said container 3 in the closed position, in the clockwise direction or, conversely, in the counter-clockwise direction. Thus, during the closing of the container 3 by pivoting it clockwise, the first point of contact 50a abuts against the first tooth 49a. Conversely, during the closing of the container 3 by pivoting it counter-clockwise, the second point of contact 50b abuts against the second tooth 49b. The beveled shape of the teeth 49a, 49b and the circular shape of the container 3 allow the lock 34 to be pushed backwards while allowing the container 3 to slide to its closed position. The backwards movement of the lock 34 concomitantly ensures the movement of the presence sensor 46, by means of the connecting rods 37, 42, which avoids any interference between the presence sensor 46 and the container 3 during the closing. Once the container 3 is in the closed position, the return element (not illustrated) ensures that the lock 34 returns to position in the housing 36, and that the presence sensor 46 returns to position in the slot 47.

Figure 16:
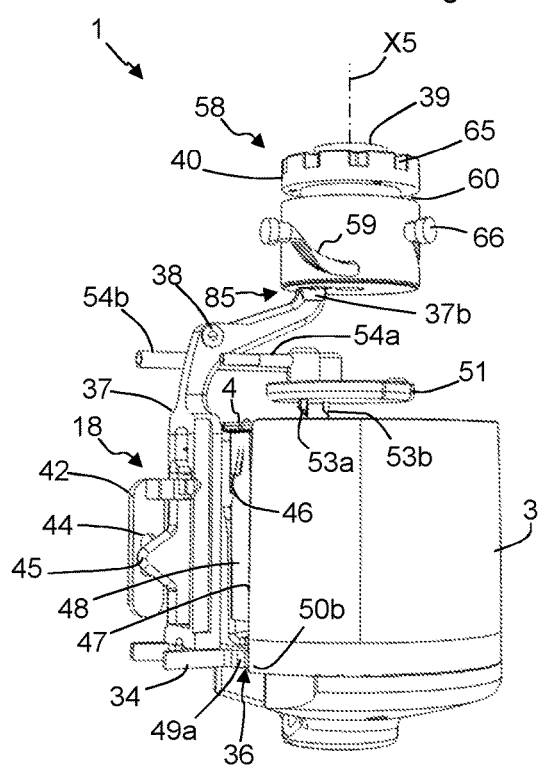
FIG. 16 illustrates an overall view showing in particular the system for moving the needle holder with the needle holder in the released position, and the container locking/unlocking system in the locked position.
Figure 19:
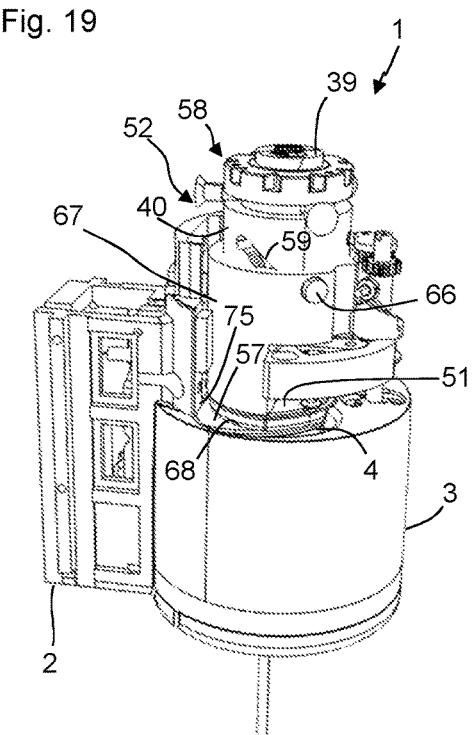
FIGS. 19 and 20 illustrate two overall views showing in particular the system for moving the needle holder in the engaged position.
Figure 20:
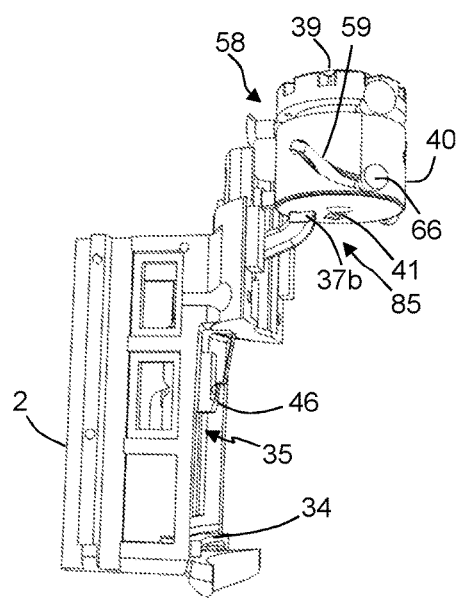
Figure 22:
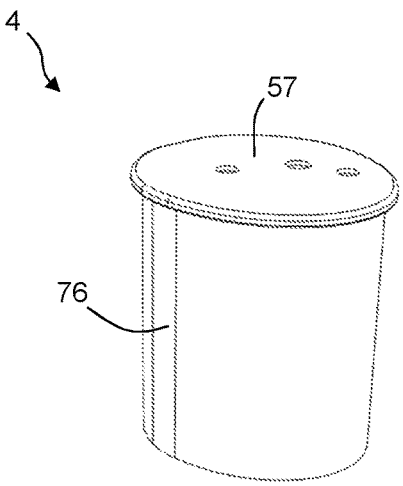
FIGS. 22 to 27 show a mode of design of a pod.
Figure 23:
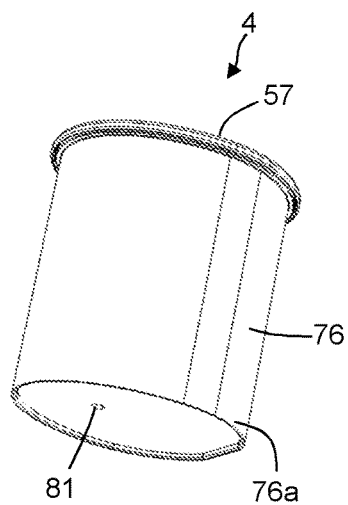
Figure 24:
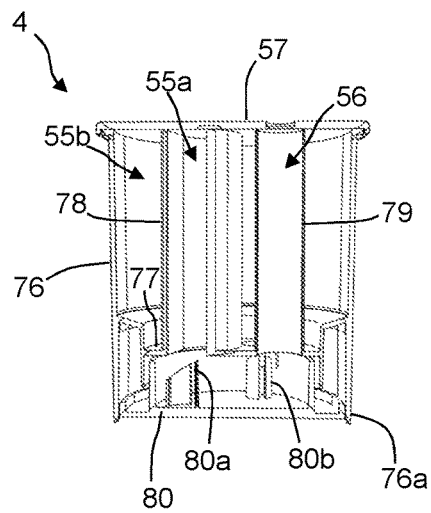
Figure 25:
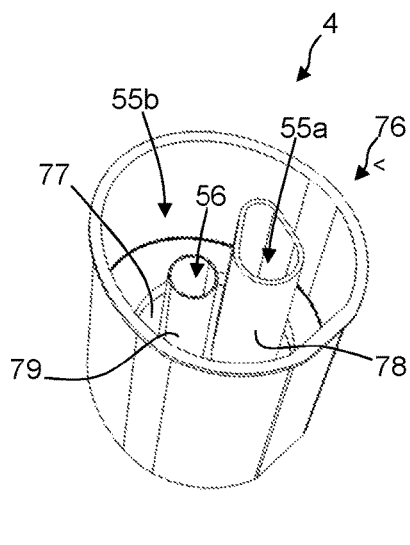
Figure 26:
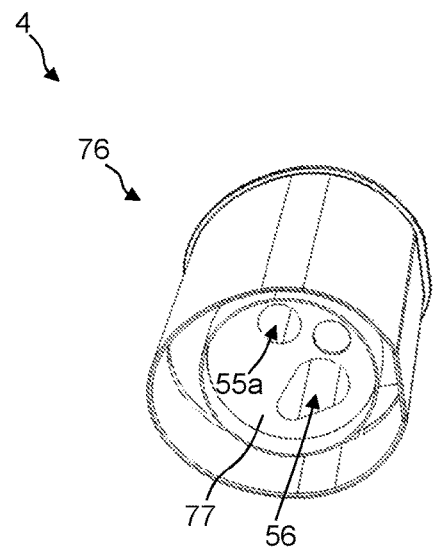
Figure 28:
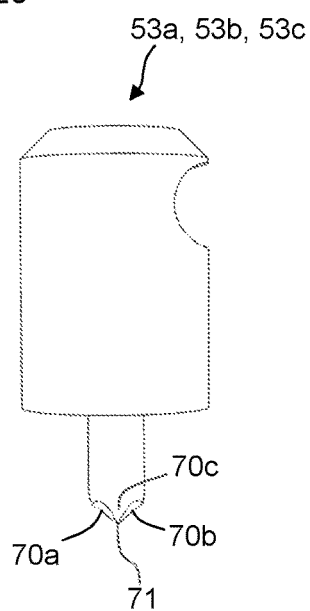
FIG. 28 illustrates an embodiment of the needles.
Figure 27:
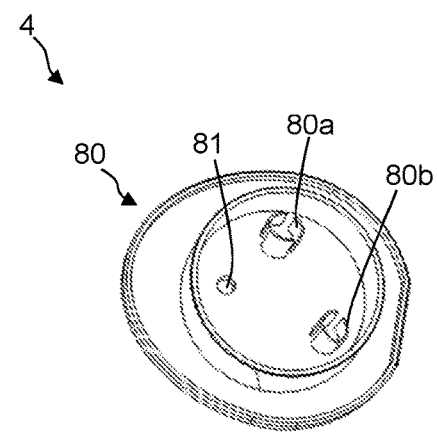

The machine 1 comprises a needle holder 51 and a system 52 for moving the needle holder 51 from a position released from the pod 4, illustrated in FIGS. 10 and 16, to a position engaged on the pod 4, illustrated in FIG. 19. The needle holder 51 receives three needles 53a, 53b, 53c connected to conduits 54a, 5ab, 54c allowing fluids to be dispensed, as illustrated in FIGS. 7 and 16. The number of needles and the types of fluids dispensed, in particular air or water, depend on the design of the pod 4. In this instance, the machine 1 is configured to receive a pod 4 comprising two storage chambers 55a, 55b, each storage chamber containing an ingredient (not illustrated), and a channel 56 for dispensing water, as illustrated in FIG. 25. During the move from the released position to the engaged position, the needles 53a, 53b, 53c perforate the seal 57 of the pod 4 illustrated in FIG. 22, and position themselves respectively in the upper parts of the two storage chambers 55a, 55b and of the channel 56.

The moving system 52 comprises a control member 58 which comprises the aforementioned body 40. This body 40 is preferably equipped with three spiral ramps 59 uniformly distributed around its cylindrical wall, for a better distribution of load. The body 40 comprises a circular throat 60 which receives three first pins 61 uniformly distributed around this throat 60 and secured to an element 62 of the frame 2, as illustrated for example by FIGS. 15 and 18. This allows the body 40 to be mounted in pivoting connection about the vertical axis X5, with respect to the frame 2. The control member 58 also comprises a wheel 63 which comprises female gear teeth 64, illustrated in FIG. 21, configured to cooperate with male gear teeth 65, illustrated for example in FIG. 15. The rotation of the wheel 63 also results in the rotation of the body 40. The moving system 52 comprises three second pins 66 secured to a piston 67 and engaged respectively in the three spiral ramps 59, as illustrated in particular in FIGS. 11 and 17 to 19. The piston 67 is secured to the needle holder 51 and it is mounted in sliding connection about the vertical axis X5. The rotation of the wheel 63 thus results in the rotation of the body 40 and, thus, the movement of the spiral ramps 59 with respect to the second pins 66, then resulting in the translation along the vertical axis X5 of the piston 67 and of the needle holder 51, with respect to the element 62 of the frame 2. With regard to the shape of the spiral ramps 59, illustrated in particular in FIGS. 17 and 18, a clockwise rotation of the wheel 63 results in a downward translation of the needle holder 51, and vice versa in the counter-clockwise direction.

As illustrated in FIGS. 7 and 19, a surface gasket 68 is arranged on the lower face of the needle holder 51, said needles 53a, 53b, 53c passing through said gasket 68. When the needle holder 51 is in the engaged position on the pod 4, this gasket 68 comes suitably into contact with the surface of the seal 57 of the pod 4, which eliminates the venting of the storage chambers 55a, 55b and of the channel 56 of the pod 4 after this seal 57 is perforated by the needles 53a, 53b, 53c and during the injection of fluids inside said pod 4.

Figure 17:
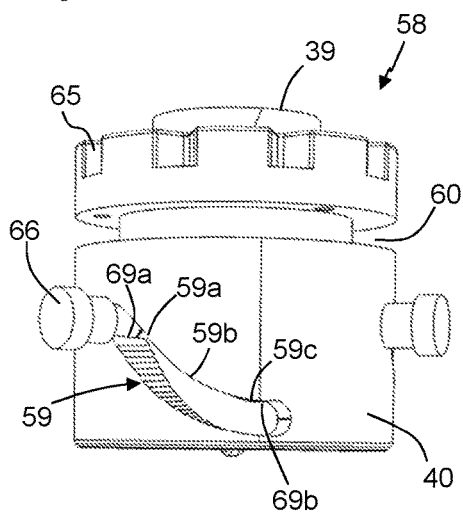
FIGS. 17 and 18 illustrate two overall views showing a ramp on the system for moving the needle holder in the released position and the engaged position, respectively.
Figure 18:
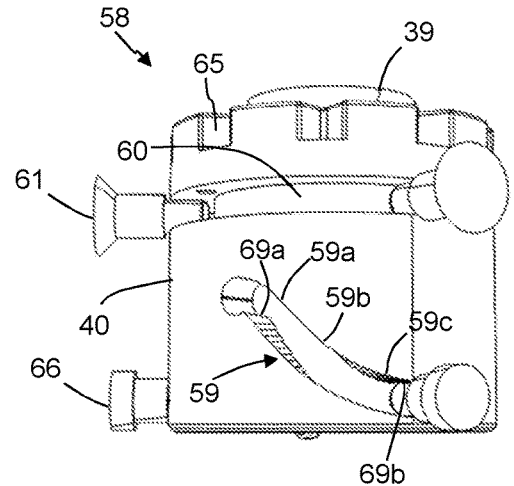

As illustrated in particular in FIGS. 17 and 18, each spiral ramp 59 comprises three different slope zones 59a, 59b, 59c. The first slope zone 59a corresponds to a zone where the needles 53a, 53b, 53c approach contact with the seal 57 of the pod 4. The other slope zones 59b, 59c correspond to two phases of a work zone where the needles 53a, 53b, 53c are engaged on the pod 4. The slope zone 59b corresponds to a first phase of penetration of the needles 53a, 53b, 53c in the seal 57 of the pod 4 and the slope zone 59c corresponds to a second phase of sealing of the pod 4 where the gasket 68 on the needle holder 51 suitably molds to the seal 57 after its perforation by said needles 53a, 53b, 53c. In addition, each spiral ramp 59 comprises two protrusions 69a, 69b allowing the body 40 to be held in position with respect to the pin 66 in two extreme rotation positions, as long as manual action is not applied on the wheel 63. This ensures that the needle holder 51 is stopped and suitably held in the engaged position and in the released position corresponding to said extreme positions. Preferably, the spiral ramps 59 are configured so that the pins 66 reach the extreme positions with respect to the body 40 by turning the wheel 63 through an angle between 50° and 90°, preferably 65°. Preferably, the moving system 52 comprises a spring (not illustrated) arranged between the piston 67 and the element 62 of the frame 2, this spring making it possible to assist the lowering of the piston 67 in the phases of approach and perforation of the seal 57 of the pod 4.

The needles 53a, 53b, 53c each comprise a sharpening with three slopes 70a, 70b, 70c so that a point 71 can be formed at the extremity of each needle, which facilitates the perforation of the seal 57 with a reduced torque during the rotation of the wheel 63. For the same purpose, it is possible to provide for different lengths for the needles 53a, 53b, 53c, which makes it possible to sequence the contacts of said needles with the seal 57 of the pod 4 and, thus, to sequence the perforation efforts of said seal. Preferably, the two off-center needles 53a, 53c are of the same length for better stability during perforation of the seal 57.

Figure 15:
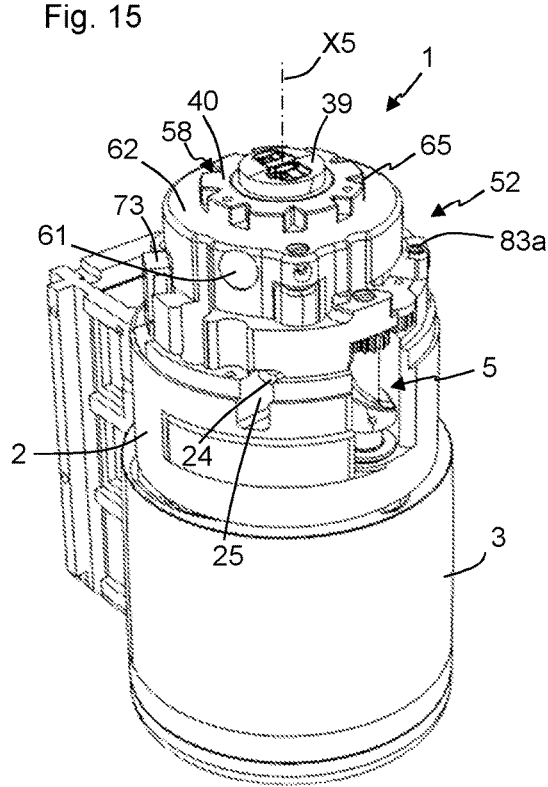
FIG. 15 illustrates an overall view showing elements of the opening/closing device and the system for moving the needle holder, with the container in the closed position.
Figure 21:
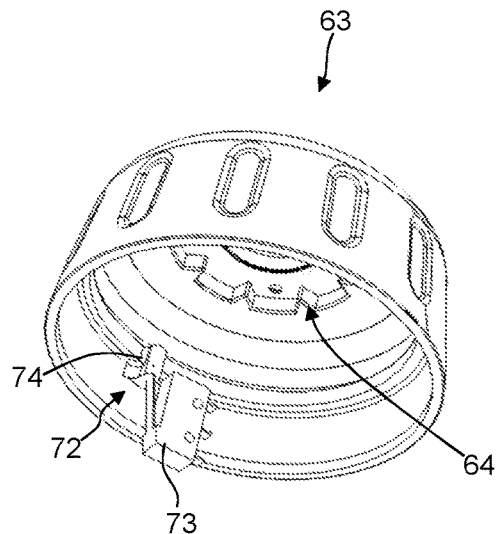
FIG. 21 illustrates an overall view showing a wheel of the system for moving the needle holder, in the engaged position.

As illustrated in particular in FIGS. 7, 15 and 21, the machine 1 comprises a system 72 for detecting the engaged position of the needles 53a, 53b, 53c on the seal 57 of the pod 4. This detection system 72 comprises a strip sensor-type switch 73, which is secured to the element 62 of the frame 2, and a protuberance 74 arranged inside the wheel 63. The needle holder 51 reaches the engaged position with respect to the pod 4 by turning the wheel 63 clockwise until the pins 66 surpass the protrusions 69b on the spiral ramps 59, in which position the protuberance 74 abuts against the switch 73 and activates it, which allows the machine 1 to initiate the cycle of dispensing fluids through the needles 53a, 53b, 53c ensuring a perfect sealing between the needle holder 51 and the pod 4 and, thus, proper dispensing of the beverage.

At the end of the beverage dispensing, the user turns the wheel 63 counter-clockwise until the pins 66 surpass the protrusions 69a on the spiral ramps 59, which allows the piston 67 and the needle holder 51 to rise. During this rise, the pod 4 could remain stuck to the needle holder 51, which could block the opening of the container 3. To guarantee that the pod 4 stays in the housing zone 33 of the container 3 during the release of the needles 53a, 53b, 53c, a stop element 75 on the frame 2 is positioned above a portion of the seal 57 of the pod 4 with the container 3 in the closed position, as illustrated by FIG. 19.

As illustrated in FIGS. 22 to 27, the pod 4 comprises a body 76 comprising an intermediate surface 77 and walls 78, 79 defining the two storage chambers 55a, 55b and the channel 56. The intermediate surface 77 is covered with a film (not represented in the figures) to close the two storage chambers 55a, 55b. The pod 4 also comprises a movable bottom 80 arranged in a sliding manner in the body 76, below the intermediate surface 77. The movable bottom comprises two needles 80a, 80b. During the placement of the needle holder 51 on the seal 57 of the pod 4, when the pins 66 are situated in the work zone on the spiral ramps 59, the movable bottom 80 slides in the body 76 of the pod 4 until it reaches the intermediate surface 77. The needles 80a, 80b perforate the film, which permits the activation of the pod 4 and the constitution of a mixing chamber (not illustrated). This mixing chamber communicates with the two chambers 55a, 55b and the channel 56, which allows the ingredients and the water inside this mixing chamber to be dispensed during the dispensing of fluids for the preparation of the beverage, which gradually flows through an outlet opening 81 arranged in the movable bottom 80. Other pod 4 designs may be envisioned, where the principle of moving the needle holder 51 from the released position to the engaged position on the pod 4 using the aforementioned moving system 52 remains identical.

When the container 3 is open for the placement of a pod 4 or the removal of a used pod 4, any movement of the needle holder 51 toward the engaged position should be avoided, so that the container 3 does not strike the needle holder 51 during the next closing, which could damage the machine 1. For this reason, the machine 1 comprises a system 82 to block the moving system 52, illustrated with regard to FIGS. 3, 7, 11 and 15. The blocking system 82 comprises a blocking part 83 mounted in sliding connection with respect to the element 62 of the frame 2 such that it slides from a retracted position, illustrated in FIG. 15, where the head 83a of the blocking part 83 is housed in the element 62 of the frame 2, to an active position, illustrated in FIGS. 3 and 7, where the head 83a of the blocking part 83 surpasses the element 62 of the frame 2 and engages in an opening 84 arranged in the bottom of the wheel 63, which blocks the rotation of this wheel 63, preventing the activation of the moving system 52 which keeps the needle holder 51 in a released position. The translation of the blocking part 83 is obtained by means of a circular groove 89 arranged on the container 3, this circular groove 89 comprising a curved bottom 90 in which is housed a foot 91 arranged at the lower extremity 83b of the blocking part 83. When the container 3 is pivoted to a closed position, the foot 91 is housed in the depression of the curved bottom 90, in the central part of the circular groove 89, as illustrated in FIGS. 10 and 11, in which position the head 83a of the blocking part is released from the opening 84. On the contrary, when the container 3 is in an open position by pivoting clockwise or counter-clockwise, the foot 90 is situated on one of the edges 89a, 89b of the circular groove 89, in the least deep portion of the curved bottom 90, in which position the head 83a is engaged in the opening 84.

When the needle holder 51 is engaged on the pod 4 for dispensing a beverage, any possibility of opening the container 3, which could also damage the machine 1, should be avoided. For this purpose, the machine 1 comprises a system 85 to deactivate the locking/unlocking system 18, preventing the lock 34 from being released from the housing 36 on the container 3. This deactivation system 85 is implemented by means of the control button 39 mounted in sliding connection with respect to the body 40 of the control member 58, said body being mounted such that it can rotate about the vertical axis X5. The finger 41 on the control button 39 is off-center with respect to the vertical axis X5. When the wheel 63 is in a position in which the pins 66 are abutting in the spiral ramps 59 at the protrusions 69a, the needle holder 51 is released from the pod 4 and the finger 41 corresponds with the upper extremity 37b of the connecting rod 37, as illustrated in FIGS. 8, 9 and 16, which allows the lock 34 to be unlocked by pressing on the control button 39 in order to open the container 3. As soon as the wheel 63 is turned and the pins 66 leave the protrusions 69a to move to the approach zone and the work zone on the spiral ramps 59, the finger 41 is released from the upper extremity 37b of the connecting rod 37, which prevents the activation of the connecting rod 37 and the release of the lock 34 when the control button 39 is pressed.

As illustrated in particular in FIGS. 1 to 4, the frame 2 of the machine 1 comprises a support foot 86 in the form of a cylindrical portion. The lower portion 3a of the container 3 comprises two flanges 87a, 87b which are positioned above the support foot 86 when said container 3 is in the closed position. During a movement of the needle holder 51 from the released position to the engaged position on the pod 4, these two flanges 87a, 87b bear against the support foot 86, which ensures load transfer during the engagement of the needle holder 51 on the pod 4.

Figure 3:
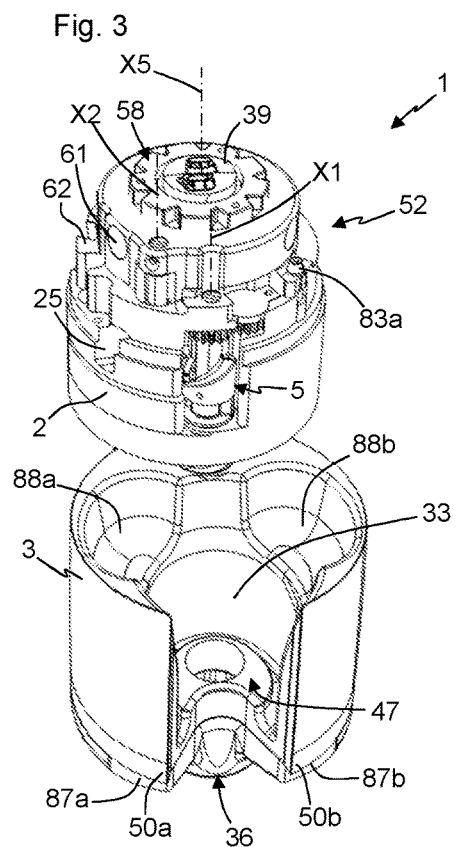
FIG. 3 illustrates an overall view showing in particular the design of the container, which is in the open position.
Figure 4:
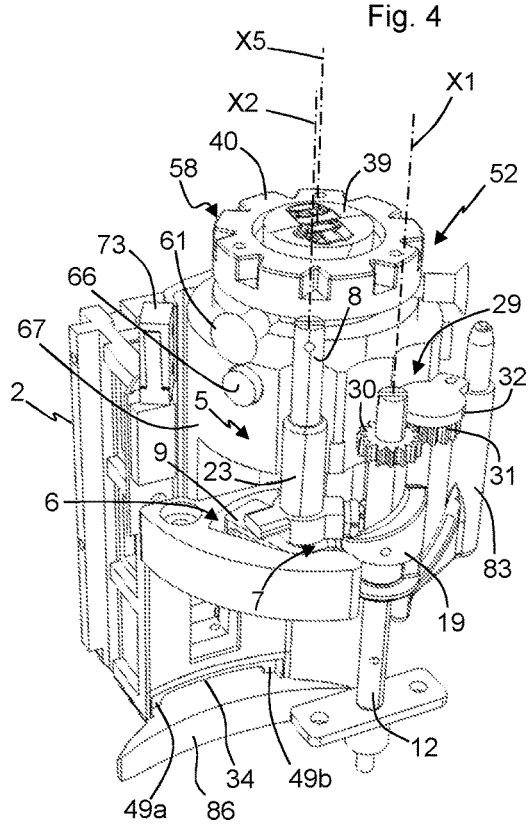
FIG. 4 illustrates an overall view showing the container opening/closing device and the system for moving the needle holder, with the container in the open position.
Figure 13:
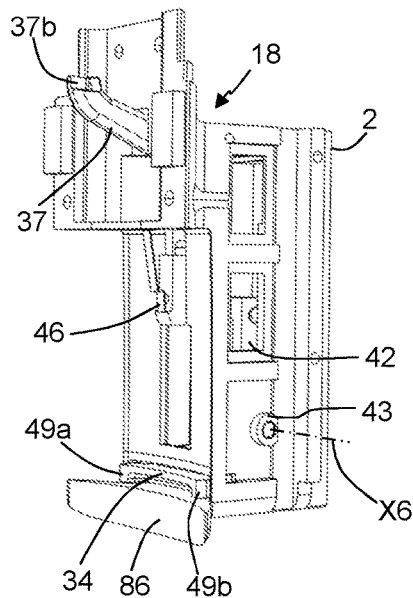
FIGS. 13 and 14 illustrate two overall views showing in particular the container locking/unlocking device, in the locked position.
Figure 14:
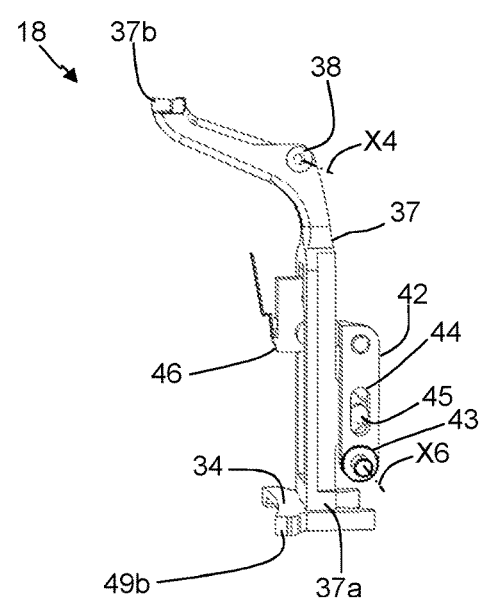

As illustrated in particular in FIGS. 2 and 3, the container 3 comprises two recesses 88a, 88b arranged on each side of the receiving zone 33 of the pod 4, which facilitates the placement of the pod 4 in said receiving zone 33, and conversely its removal. For the same purpose, the slot 47 also facilitates the manipulation of the pod 4 during its positioning in the container 3 or its removal from the latter.

The container 3 also comprises a support part (not illustrated) receiving the pod 4, this support part being configured to be removably housed in the receiving zone 33, in order to allow it to be removed and facilitate the cleaning of said container 3.

The machine 1 also comprises a reading system (not illustrated), for example a barcode reader, which is arranged on the frame 2 or on the second connecting rod 42, such that it is positioned opposite the slot 47 on the container 3 arranged in the closed position and such that it allows the reading of a graphic code arranged on the portion of the contour 48 of the pod 4 appearing at the slot 47. This allows the machine 1 to recognize the type of pod 4 arranged in the container 3 and the beverage to prepare, in order to control the dispensing of fluids accordingly. When the presence sensor 46 indicates the presence of a pod 4 in the container 3 in the closed position, and the switch 73 indicates that the needle holder 51 is in the engaged position on the pod 4, and the reading system has recognized the type of pod 4 arranged in the container, the activation management system (not illustrated) of the machine 1 controls the fluid-dispensing device in order to supply the quantities of fluids necessary to prepare the beverage. This reading system may also fulfill the function of the presence sensor 46, since the reading of the graphic code systematically indicates the presence of a pod 4 in the receiving zone 33 of the container 3.

The preceding description is not restrictive in nature, numerous variants being possible without departing from the context of the invention. For example, one could provide for implementation variants for the system 52 for moving the needle holder 51. For example, one could provide for a reversal of the direction of the ramps 59 on the body 40 of the control member 58, for the movement of the needle holder 51 from the released position to the engaged position on the pod 4, and vice versa. In this case, the direction of rotation of the wheel 63 will be reversed. One could also provide for needles 53a, 53b, 53c having identical lengths and coming into contact simultaneously with the seal 57 of the pod 4.

One could also provide for a different number of needles, according to the type of pod 4 that may be used to prepare beverages.

In one embodiment, the machine 1 allows cold beverages to be prepared. However, one can envision embodiment variants for the preparation of hot beverages, the machine 1 being in this case equipped with a hot water production device heating the water prior to its dispensing.

The invention claimed is:

1. A machine for dispensing beverages from a pod, comprising a frame, a container including a pod-receiving zone, a fluid-dispensing needle holder to hold fluid-dispensing needles and a moving system for moving the fluid-dispensing needle holder from a released position released from the pod to an engaged position engaged on the pod, and vice versa, the moving system comprising a control member mounted in rotation about a vertical axis on the frame, wherein the control member comprises a wheel and a body equipped with at least one spiral ramp which cooperates with at least one pin secured to a piston, the wheel and the body being configured for rotation about the vertical axis with respect to the frame, the piston being secured to the needle holder and mounted in translation along the vertical axis, said at least one spiral ramp comprising at least two different slope zones, configured to correspond respectively to a zone where the fluid-dispensing needles approach contact with the pod and to a work zone where the fluid-dispensing needles are engaged on the pod, wherein rotation of the wheel results in rotation of the body and movement of the at least one pin of the piston along said at least one spiral ramp of the body, thereby translationally moving the piston along the vertical axis and moving the fluid-dispensing needle holder between the released position and the engaged position.

2. The machine according to claim 1, wherein the work zone is configured to include a first phase of penetration of the fluid-dispensing needles in the pod and a second phase of sealing the pod by means of a gasket arranged on the fluid-dispensing needle holder.

3. The machine according to claim 2, wherein the gasket is on a surface on the fluid-dispensing needle holder, said fluid-dispensing needles passing through the gasket.

4. The machine according to claim 1, wherein the at least one spiral ramp comprises two stopping protrusions at extreme rotation positions of the control member.

5. The machine according to claim 1, wherein the at least one spiral ramp is configured so that movement of the fluid-dispensing needle holder from the released position to the engaged position, and vice versa, is carried out by turning the wheel through an angle between 50° and 90°.

6. The machine according to claim 5, wherein the at least one spiral ramp is configured so that movement of the fluid-dispensing needle holder from the released position to the engaged position, and vice versa, is carried out by turning the control member through an angle of 65°.

7. The machine according to claim 1, wherein the body comprises three uniformly distributed ramps.

8. The machine according to claim 1, wherein the moving system comprises means for assisting the lowering of the piston.

9. The machine according to claim 8, wherein the means for assisting the lowering of the piston comprise a spring.

10. The machine according to claim 1, further comprising a detection system for detecting the engaged position of the fluid-dispensing needles on the pod.

11. The machine according to claim 10, wherein said detection system comprises a switch.

12. The machine according to claim 1, wherein the fluid-dispensing needles each comprise a sharpening with three slopes.

13. The machine according to claim 1, wherein the fluid-dispensing needles are of at least two different lengths.

14. The machine according to claim 1, further comprising means for abutment against the pod with the container in a closed position with respect to the frame, configured to guarantee that the pod is held in position in the container during the release of the fluid-dispensing needle holder.

15. The machine according to claim 1, further comprising an opening/closing device arranged between the frame and the container to pivot the container about a vertical axis between a closed position permitting dispensing, and an open position permitting access to said container, and a locking/unlocking system configured to keep the container in the closed position with respect to the frame and, conversely, to release the container so that the container is pivotable into the open position.

16. The machine according to claim 15, further comprising a system for deactivation of the locking/unlocking system configured to prevent activation of said locking/unlocking system as long as the moving system for moving the needle holder is in the engaged position on the pod.

17. The machine according to claim 15, further comprising a system for blocking the moving system, configured to keep the needle holder in the released position released from the pod as long as the container has not returned to the closed position.

18. The machine according to claim 1, further comprising a load transfer means arranged between the frame and the container, configured to stabilize the container during operation of the machine.

19. The machine according to claim 1, wherein the body is mounted such that the body is only configured for rotation about the vertical axis.

20. The machine according to claim 1, wherein the body further comprises a circular throat for receiving one or more pins secured to the frame.

* * * * *